(12) United States Patent
Yoon et al.

(10) Patent No.: US 12,494,040 B2
(45) Date of Patent: Dec. 9, 2025

(54) COMPUTER SYSTEM OF UNSUPERVISED LEARNING WITH DEEP SIMILARITY FOR OPTICAL FLOW ESTIMATION AND METHOD THEREOF

(71) Applicant: Korea Advanced Institute Of Science And Technology, Daejeon (KR)

(72) Inventors: Sung-Eui Yoon, Daejeon (KR); Woobin Im, Daejeon (KR); Tae Kyun Kim, Daejeon (KR)

(73) Assignee: Korea Advanced Institute Of Science And Technology, Daejeon (KR)

(*) Notice: Subject to any disclaimer, the term of this patent is extended or adjusted under 35 U.S.C. 154(b) by 1045 days.

(21) Appl. No.: 17/538,555

(22) Filed: Nov. 30, 2021

(65) Prior Publication Data
US 2022/0366669 A1 Nov. 17, 2022

(30) Foreign Application Priority Data

May 14, 2021 (KR) .................... 10-2021-0062354

(51) Int. Cl.
*G06V 10/74* (2022.01)
*G06N 20/00* (2019.01)
(Continued)

(52) U.S. Cl.
CPC .......... *G06V 10/761* (2022.01); *G06N 20/00* (2019.01); *G06V 10/80* (2022.01); *G06V 10/82* (2022.01);
(Continued)

(58) Field of Classification Search
CPC ........ G06F 18/00; G06F 18/25; G06F 18/251; G06F 18/253; G06F 18/2413; G06F 18/2414; G06F 16/786; G06F 2123/02; G06F 2218/16; G06N 3/088; G06N 20/00; G06N 3/045; G06N 3/04; G06N 3/082; G06N 3/0464; G06V 10/761; G06V 10/80; G06V 10/82; G06V 10/25; G06V 10/62;
(Continued)

(56) References Cited

U.S. PATENT DOCUMENTS 10,958,869 B1 * 3/2021 Chi ................... H04N 11/02
11,790,550 B2 * 10/2023 Xiao .................. G06T 7/593
(Continued)

FOREIGN PATENT DOCUMENTS

CN 108805900 B * 4/2021 ............ G06N 3/08
KR 10-2020-0010971 1/2020

OTHER PUBLICATIONS

Meister, Simon, Junhwa Hur, and Stefan Roth. "Unflow: Unsupervised learning of optical flow with a bidirectional census loss." Proceedings of the AAAI conference on artificial intelligence. vol. 32. No. 1. pp. 7251-7259 (Year: 2018).*

(Continued)

*Primary Examiner* — Sumati Lefkowitz
*Assistant Examiner* — Ryan P Potts
(74) *Attorney, Agent, or Firm* — NIXON PEABODY LLP

(57) ABSTRACT

A computer system of unsupervised learning with deep similarity for optical flow estimation is provided. The computer system is configured to calculate deep similarity by using deep features extracted from a sequence of a plurality of images, and learning optical flow for the images based on the deep similarity.

15 Claims, 7 Drawing Sheets

(51) Int. Cl.
*G06T 7/20* (2017.01)
*G06V 10/80* (2022.01)
*G06V 10/82* (2022.01)
*H04N 19/513* (2014.01)
*G06N 3/04* (2023.01)
*G06N 3/088* (2023.01)

(52) U.S. Cl.
CPC ............. *H04N 19/513* (2014.11); *G06N 3/04* (2013.01); *G06N 3/088* (2013.01); *G06T 7/20* (2013.01); *G06T 2207/10016* (2013.01)

(58) Field of Classification Search
CPC .... G06V 10/806; G06V 10/751; G06V 10/74; G06V 10/757; G06V 10/993; G06V 20/58; G06V 20/52; G06V 40/20; G06V 40/23; G06V 40/28; G06T 7/20; G06T 7/251; G06T 7/215; G06T 2207/10016; G06T 7/0016; G06T 7/246; G06T 7/269; G06T 7/248; G06T 7/70; G06T 7/207; G06T 7/285; G06T 7/30; G06T 7/73; G06T 7/74; G06T 5/50; G06T 3/4046; G06T 9/004; G06T 9/002; G06T 9/001; H04N 19/513; H04N 19/137; H04N 19/51; H04N 19/593; H04N 19/527; H04N 19/167; H04N 19/53; H04N 19/553; H04N 19/58; H04N 5/144; H04N 2013/0085

See application file for complete search history.

(56) References Cited

U.S. PATENT DOCUMENTS

| | | | |
|---|---|---|---|
| 2020/0084427 A1* | 3/2020 | Sun | G06N 3/045 |
| 2020/0211206 A1* | 7/2020 | Wang | G06N 3/08 |
| 2020/0265590 A1* | 8/2020 | Daniilidis | G06T 7/269 |
| 2021/0142497 A1* | 5/2021 | Pugh | G06T 7/543 |
| 2022/0156946 A1* | 5/2022 | Lin | G06T 7/248 |
| 2022/0335624 A1* | 10/2022 | Maurer | G06T 5/77 |

OTHER PUBLICATIONS

Li, Jianfeng, et al. "Occlusion aware unsupervised learning of optical flow from video." Thirteenth International Conference on Machine Vision. vol. 11605. SPIE, Jan. 4, 2021. pp. 1-8 (Year: 2021).*

Im, W et al., "Unsupervised Learning of Optical Flow with Deep Feature Similarity," 16th European Conference on Computer Vision, Aug. 23, 2020.

Teed Z. et al., RAFT: Recurrent All-Pairs Field Transforms for Optical Flow; Princeton University, Aug. 25, 2020, 21 pp.

* cited by examiner

COMPUTER SYSTEM OF UNSUPERVISED LEARNING WITH DEEP SIMILARITY FOR OPTICAL FLOW ESTIMATION AND METHOD THEREOF

This application claims the priority benefit of Korean Patent Application No. 10-2021-0062354, filed on May 14, 2021, in the Korean Intellectual Property Office, the disclosure of which is incorporated herein by reference.

BACKGROUND

1. Field of the Invention

Various example embodiments relate to a computer system of unsupervised learning with deep similarity for optical flow estimation and a method thereof.

This work was supported by Institute of Information & communications Technology Planning & Evaluation (IITP) grant and National Research Foundation of Korea (NRF) grant, funded by the Korea government (MSIT) (IITP-2015-0-00199 and No. 2019R1A2C3002833)

2. Description of Related Art

Optical flow represents a problem of finding which pixel of a first image corresponds to which pixel of a second image when two separate images are given at an interval time t. Recently, deep learning is used to solve the optical flow problem, and these studies are divided into a case with correct answer data (supervised learning) and a case without correct answer data (unsupervised learning). The unsupervised learning of them is to learn a deep learning model that estimates the optical flow by receiving tens of thousands of consecutive images that do not know the optical flow. The deep learning model learned in this way may quickly calculate the optical flow when other consecutive images are input.

Such unsupervised learning generally uses a RGB based photometric loss function. This is based on an assumption that RGB that a moving object (e.g., ball, chair, etc.) had in a first image will be maintained in a second image. In addition to RGB, features representing any local area of an image may be used, and as an example, a gradient representing edge of an object, or census transform representing binary the gradient in multiple directions are used. These features have a disadvantage of having only low-level information. In other words, in a real video, since an object enters shadow, the object is partially obscured, and is blurred by movement, the assumption that features including RGB are maintained is wrong.

SUMMARY

Various example embodiments provide a computer system of unsupervised learning with deep similarity for optical flow estimation and a method thereof.

A method of a computer system according to various example embodiments may include calculating deep similarity by using deep features extracted from a sequence of a plurality of images, and learning optical flow for the images based on the deep similarity.

A computer system according to various example embodiments may include a memory, and a processor connected to the memory and configured to execute at least one instruction stored in the memory. According to various example embodiments, the processor may be configured to calculate deep similarity by using deep features extracted from a sequence of a plurality of images, and learn optical flow for the images based on the deep similarity.

A non-transitory computer-readable medium according to various example embodiments may store at least one program for execute a method comprising calculating deep similarity by using deep features extracted from a sequence of a plurality of images, and learning optical flow for the images based on the deep similarity.

According to various example embodiments, the computer system may estimate optical flow through unsupervised learning. Particularly, the computer system may learn a deep learning model for estimating optical flow through the unsupervised learning based on deep similarity for a sequence of a plurality of images. By using such deep learning model, the computer system may quickly estimate optical flow for a plurality of other images which are inputted. At this time, the computer system estimates optical flow by using a feature separation loss function obtained by dividing occlusion locations and non-occlusion locations on a deep similarity map, so the performance of the optical flow may be increased. In other words, the computer system may learn higher-performance of optical flow based on higher-level information.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Hereinafter, embodiments of the disclosure are described in detail with reference to the accompanying drawings. Various example embodiments provide a computer system of unsupervised learning with deep similarity for optical flow estimation and a method thereof.

Since the existing photometric loss function uses low-level features such as RGB, gradient, and census, it has a disadvantage that it is not strong to changes in various real environments. On the other hand, as demonstrated in various fields, deep features are strong to changes in various real environments such as changes of lights or changes of object angle. Accordingly, various example embodiments may supplement the disadvantage of the existing photometric loss function by using the deep features.

Figure 1:
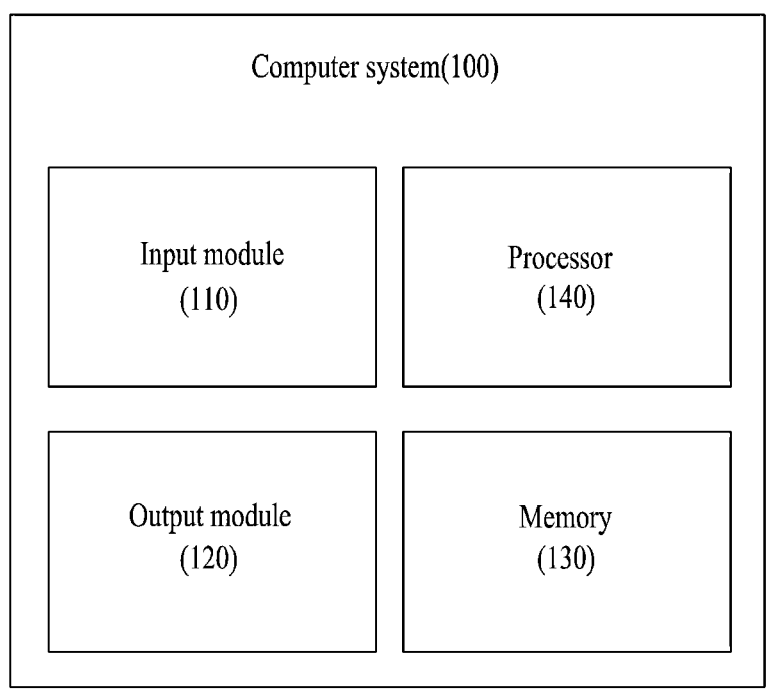
FIG. 1 is a block diagram illustrating a configuration of a computer system according to various example embodiments.
Figure 2:
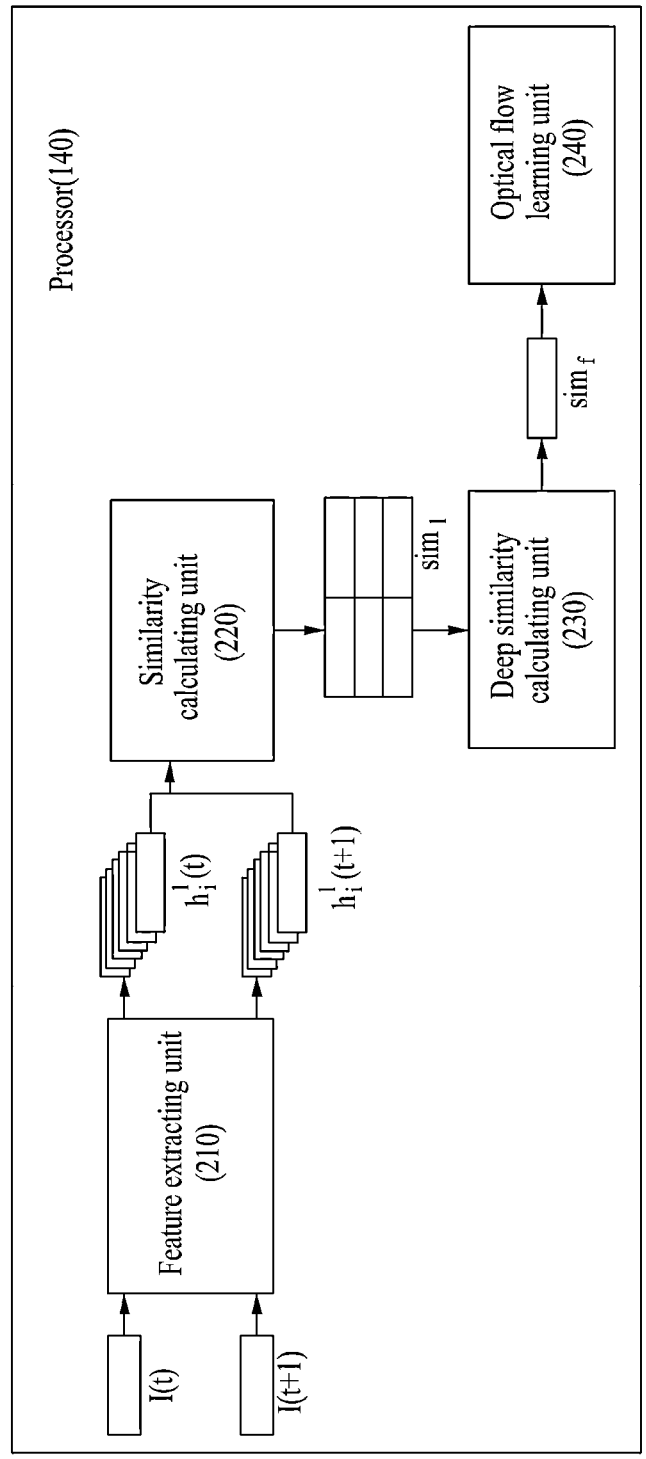
FIG. 2 is a block diagram illustrating a detailed configuration of a processor of FIG. 1.
Figure 3:
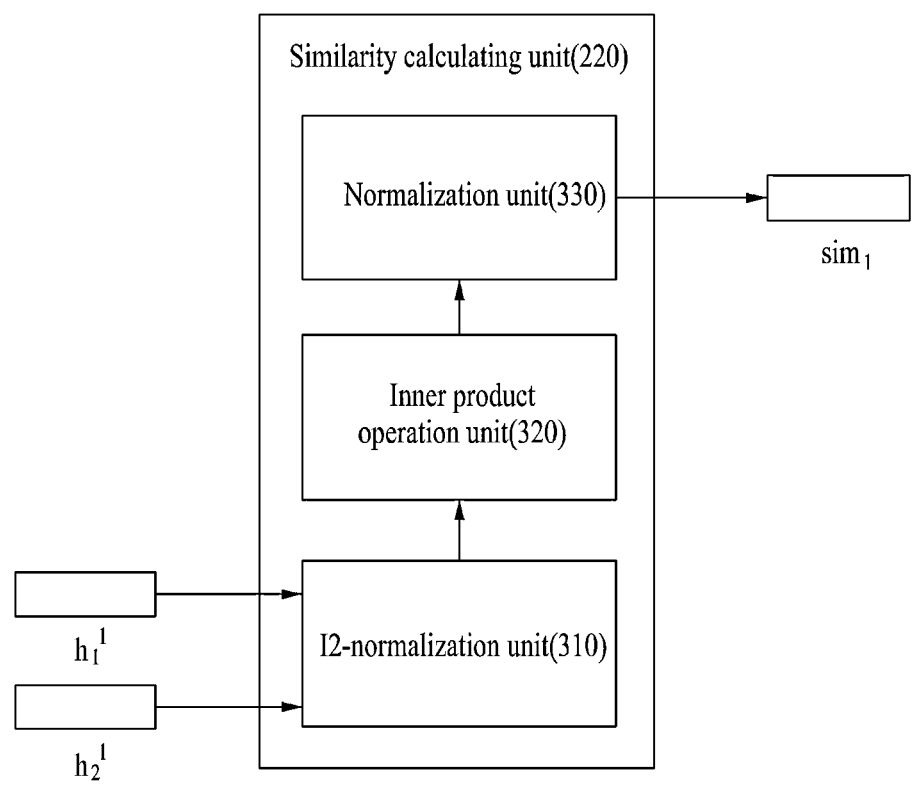
FIG. 3 is a block diagram illustrating a detailed configuration of a similarity calculating unit of FIG. 2.
Figure 4:
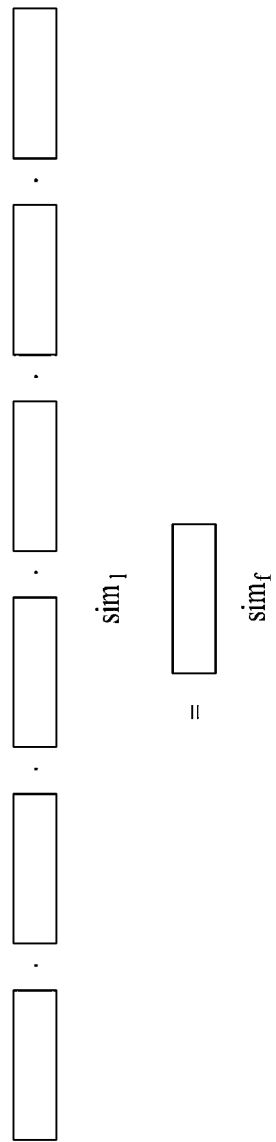
FIG. 4 is a drawing for describing operation of a deep similarity calculating unit of FIG. 2.

FIG. 1 is a block diagram illustrating a configuration of a computer system 100 according to various example embodiments. FIG. 2 is a block diagram illustrating a detailed configuration of a processor 140 of FIG. 1. FIG. 3 is a block diagram illustrating a detailed configuration of a similarity calculating unit 220 of FIG. 2. FIG. 4 is a drawing for describing operation of a deep similarity calculating unit 230 of FIG. 2.

Referring to FIG. 1, the computer system 100 according to various example embodiments may include at least one of an input module 110, an output module 120, a memory 130, or a processor 140. In some example embodiments, at least one of elements of the computer system 100 may be omitted, and at least one of other elements may be added. In some example embodiments, at least two of the elements of the computer system 100 may be implemented as one integrated circuit. At this time, the computer system 100 may be configured with at least one device, for example, at least one of at least one server or at least one electronic device. For example, the electronic device may include at least one of a smart phone, a mobile phone, a navigation device, a computer, a laptop computer, a terminal for digital broadcasting, personal digital assistants (PDA), a portable multimedia player (PMP), a tablet PC, a game console, a wearable device, an Internet of things (IoT) device, a home appliance, a medical device, or robot. In some example embodiments, when the computer system 100 includes a plurality of devices, the elements of the computer system 100 may be configured in one of the devices or distributed and configured in at least two of the devices.

The input module 110 may input signals to be used to at least one element of the computer system 100. The input module 110 may include at least one of an input device configured to directly input signals to the computer system 100 by a user, a sensor device configured to generate signals by sensing changes in the surroundings, or a receiving device configured to receive signals from external devices. For example, the input device may include at least one of a microphone, a mouse, or a keyboard. In some example embodiments, the input device may include at least one of a touch circuitry set to sense touch or a sensor circuitry set to measure force generated by touch.

The output module 120 may output information to the outside of the computer system 100. The output module 120 may include at least one of a display device configured to output information visually, an audio output device which may output information into audio signals, or a transmitting device which may transmit information wirelessly. For example, the display device may include at least one of a display, a hologram device, or a projector. As one example, the display device may be assembled with at least one of the touch circuitry or the sensor circuitry of the input module 110, and implemented in a touch screen. For example, the audio output device may include at least one of a speaker or a receiver.

According to one example embodiment, the receiving device and the transmitting device may be implemented as a communication module. The communication module may perform communication with external devices in the computer system 100. The communication module may set a communication channel between the external devices and the computer system 100, and perform communication with the external devices through the communication channel. Here, the external devices may include at least one of a vehicle, a satellite, a base station, a server, or another computer system. The communication module may include at least one of a wired communication module or a wireless communication module. The wired communication module may be connected via wires to an external device and communicate with it via wires. The wireless communication module may include at least one of a short-range communication module or a long-range communication module. The short-range communication module may communicate with an external device by a short-range communication method. The short-range communication method may include, for example, at least one of Bluetooth, WiFi direct, and Infrared data association (IrDA). The long-range communication module may communicate with an external device by a long-range communication method. Here, the long-range communication module may communicate with an external device through a network. The network may include, for example, at least one of a cellular network, the Internet, and a computer network such as LAN (local area network) or WAN (wide area network).

The memory 130 may store various data used by at least one element of the computer system 100. The memory 130 may include, for example, at least one of volatile memory and nonvolatile memory. The data may include at least one program and input data or output data associated therewith. The program may be stored as software including at least one instruction in the memory 130, and may include, for example, at least one of an operating system, middleware, or an application.

The processor 140 may execute the program of the memory 130 and control at least one element of the computer system 100. Through this, the processor 140 may perform data processing or calculation. At this time, the processor 140 may execute the instructions stored in the memory 130. The processor 140 may include a deep learning model for estimating optical flow. At this time, the processor 140 may learn the deep learning model through unsupervised learning. Through this, the processor 140 may quickly estimate optical flow for inputted images by using the deep learning model. According to various example embodiments, the processor 140 may learn the deep learning model through unsupervised learning based on deep similarity for a sequence of a plurality of images I(t), I(t+1) (here, I(t) representing image of time t and I(t+1) representing time-sequential images to I(t)).

The processor 140 may calculate deep similarity for images by using deep features $h_i^1(t)$, $h_i^1(t+1)$ (here, i representing an identifier for an image, and I representing an identifier for a layer) extracted from the sequence of images I(t), I(t+1). For this, the processor 140 may include a feature extracting unit 210, a similarity calculating unit 220, and a deep similarity calculating unit 230 as shown in FIG. 2.

The feature extracting unit 210 may extract the deep features $h_i^1(t)$, $h_i^1(t+1)$ from each of the images I(t), I(t+1) by using a deep network consisting of a plurality of layers. At this time, for each of the images I(t), I(t+1), the deep features $h_i^1(t)$, $h_i^1(t+1)$ may be extracted as space convolutional features for each of layers. For example, for six layers, six space convolutional features may be extracted as local feature vectors from each of the images I(t), I(t+1), and each of the space convolutional features may consist of the deep features $h_i^1(t)$, $h_i^1(t+1)$ for locations in the corresponding image.

The similarity calculating unit 220 may calculate similarity in locations mapped to each other on the images I(t), I(t+1) based on an inner product of the deep features $h_i^1(t)$, $h_i^1(t+1)$ of the locations, for each of the layers. Through this, the similarity calculating unit 220 may generate similarity maps $sim_1$ of the images I(t), I(t+1) to individually respond to the layers. Here, in each of the similarity maps, location of each similarity may correspond to pixel in the map, and accordingly, the number of similarity may be the same with the number of pixel. For example, for six layers, six similarity maps $sim_1$ may be generated.

The similarity calculating unit 220 may include a l2-normalization unit 310, an inner product operation unit 320, and a normalization unit 330 as shown in FIG. 3. The l2-normalization unit 310 may l2-normalize the deep features $h_i^1(t)$, $h_i^1(t+1)$ of a first layer on a channel axis, for each of the images I(t), I(t+1) to individually respond to the layers. Here, in each of the similarity maps, location of each similarity may correspond to pixel in the map, and accordingly, the number of similarity may be the same with the number of pixel. For example, for six layers, six similarity maps sim1 may be generated.

The deep similarity calculating unit 230 may calculate deep similarity in locations mapped to each other on the layers by fusing similarities of the locations by a product. Through this, the deep similarity calculating unit 230 may generate deep similarity map $sim_f$ of the images I(t), I(t+1). In other words, the deep similarity calculating unit 230 may generate the deep similarity map $sim_f$ by fusing similarity maps by a product. For example, as shown in FIG. 4, one deep similarity map $sim_f$ may be generated from six similarity map $sim_1$. At this time, the deep similarity maps $sim_f$ may be expressed as [Equation 1] below. Since the deep similarity is calculated as a result based on the deep learning model for estimating optical flow, i.e., optical flow of the images I(t), I(t+1) estimated by using the deep learning model before learning, the deep similarity may be referred as score or accuracy for optical flow.

$$sim_f(\cdot) = \prod_{l=1}^{L} sim_l(\cdot; h_i^l, \hat{F}_i) \quad \text{[Equation 1]}$$

Here, the deep learning model for estimating optical flow, i.e., optical flow of the images I(t), I(t+1) estimated by using the deep learning model before learning may be represented.

The processor 140 may learn the optical flow for the images I(t), I(t+1) based on the deep similarity. In other words, the processor 140 may learn the deep learning model for estimating the optical flow through unsupervised learning based on the deep similarity. For this, the processor 140 may include an optical flow learning unit 240 as shown in FIG. 2.

The optical flow learning unit 240 may learn the optical flow by using a feature separation loss function $L_f$. At this time, the feature separation loss function $L_f$ may increase performance of the optical flow by increasing discrimination of the deep similarity.

For this, the optical flow learning unit 240 may configure the feature separation loss function $L_f$ based on the deep similarity map $sim_f$. In particular, the optical flow learning unit 240 may estimate occlusion locations and non-occlusion locations on the deep similarity map $sim_f$. Here, the occlusion locations may represent locations where an object is obscured by a shadow or other object, or blurred by movement. For example, the optical flow learning unit 240 may estimate the occlusion locations and the non-occlusion locations on the deep similarity map $sim_f$ by analyzing forward-backward consistency of the images I(t), I(t+1). Also, the optical flow learning unit 240 may calculate a first average similarity $k_{occ}$ from the deep similarities of the occlusion locations on the deep similarity map $sim_f$, and calculate a second average similarity $k_{noc}$ from the deep similarities of the non-occlusion locations on the deep similarity map $sim_f$. Also, the optical flow learning unit 240 may define a similarity threshold value k based on the first average similarity $k_{occ}$ and the second average similarity $k_{noc}$. At this time, the similarity threshold value k may be an average value of the first average similarity $k_{occ}$ and the second average similarity $k_{noc}$ as [Equation 2] below. Through this, the optical flow learning unit 240 may configure the feature separation loss function $L_f$ based on the deep similarity map $sim_f$ and the similarity threshold value k as [Equation 3] below. With this, the feature separation loss function $L_f$ may be configured to increase contrast in the deep similarity map $sim_f$ based on the similarity threshold value k. This may be interpreted that the feature separation loss function $L_f$ may decrease entropy, in other words, minimize entropy.

$$k = \frac{1}{2}(k_{noc} + k_{occ}) \quad \text{[Equation 2]}$$

$$L_f = \frac{1}{N}\sum_i^N \sum_{(x,y,t)\in\Omega} -(sim_f(x, y, t) - k)^2 \quad \text{[Equation 3]}$$

In some example embodiments, the optical flow learning 240 may learn the optical flow by using further at least one of a photometric loss function $L_r$ based on the deep similarity map $sim_f$, a smoothness loss function $L_s$ based on the deep similarity map $sim_f$, and a data distillation loss function La as well as the feature separation loss function $L_f$. For this, the optical flow learning unit 240 may configure the photometric loss function $L_r$ based on the deep similarity map $sim_f$ as [Equation 4] below. Meanwhile, the optical flow learning unit 240 may configure the smoothness loss function $L_s$ based on the deep similarity map $sim_f$ as [Equation 5] below. Meanwhile, the optical flow learning unit 240 may configure the data distillation loss function $L_d$ as [Equation 6] below, with an already known method.

$$L_r = \frac{1}{N}\sum_i^N \sum_{(x,y,t)\in\Omega} \Psi(\cdot)\hat{C}_i^o(x, y, t)sim_f(x, y, t) \quad \text{[Equation 4]}$$

$$L_s = \frac{1}{N}\sum_i^N \sum_{(x,y,t)\in\Omega} (|\nabla u|^2 + |\nabla v|^2)M_l(x, y, t), \quad \text{[Equation 5]}$$

$$M_l(x, y, t) = \begin{cases} 1, & \text{if } sim_f(\cdot) < k \\ 0, & \text{otherwise} \end{cases}$$

$$L_d = \frac{1}{N}\sum_i^N \sum_{(x,y,t)\in\Omega} \Psi(\hat{F}_i^s(x, y, t) - \hat{F}_i^t(x, y, t))M_f(x, y, t) \quad \text{[Equation 6]}$$

In other words, the optical flow learning unit 240 may configure a final loss function L based on at least one of the feature separation loss function $L_f$, the photometric loss function $L_r$, the smoothness loss function $L_s$, and the data distillation loss function $L_d$, and may learn the optical flow by using the final loss function L. According to one example embodiment, the optical flow learning unit 240 may configure the final loss function L based on at least one of the feature separation loss function $L_f$, the photometric loss function $L_r$, and the smoothness loss function $L_s$ as [Equation 7] below. At this time, the optical flow learning unit 240 may apply different weight values (e.g. $\alpha_f$, $\lambda_s$) for the feature separation loss function $L_f$, the photometric loss function $L_r$, and the smoothness loss function $L_s$. According to another example embodiment, the optical flow learning unit 240 may configure the final loss function L based on the feature separation loss function $L_f$, the photometric loss function $L_r$, the smoothness loss function $L_s$, and the data distillation loss function $L_d$ as [Equation 8] below. At this time, the optical flow learning unit 240 may apply different weight values (e.g. $\lambda_f$, $\lambda_s$, $\lambda_d$) for the feature separation loss function $L_f$, the photometric loss function $L_r$, the smoothness loss function $L_s$, and the data distillation loss function $L_d$.

$$L=L_r+\lambda_f L_f+\lambda_s L_s \qquad \text{[Equation 7]}$$

$$L=L_r+\lambda_f L_f+\lambda_s L_s+\lambda_d L_d \qquad \text{[Equation 8]}$$

Figure 5:
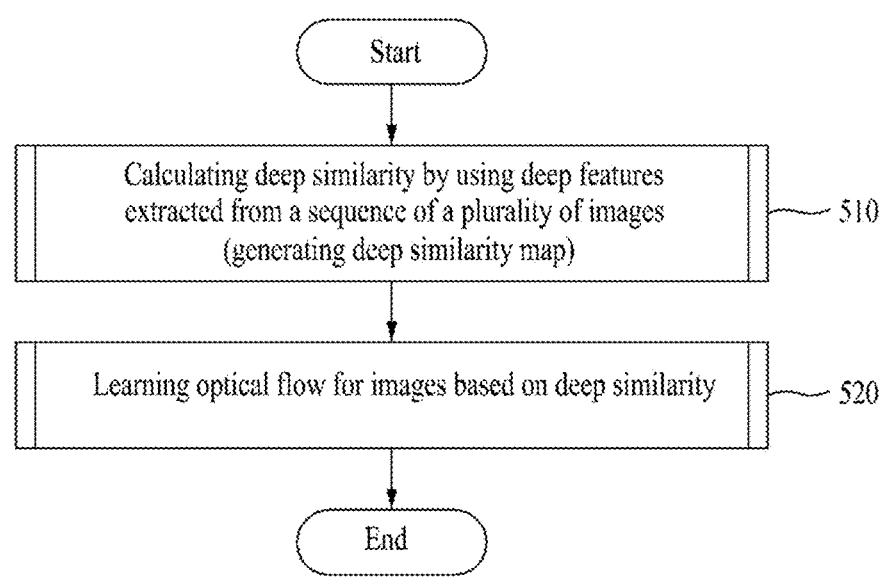
FIG. 5 is a flow chart illustrating a configuration of a method of a computer system according to various example embodiments.

FIG. 5 is a flow chart illustrating a configuration of a method of the computer system 100 according to various example embodiments.

Referring to FIG. 5, the computer system 100 may calculate deep similarity by using deep features $h_i^1(t)$, $h_i^1(t+1)$ extracted from a sequence of a plurality of images I(t), I(t+1) in Step 510. At this time, a plurality of similarity maps $sim_1$ may be generated. Regarding this, it will be described in more detail below with reference to FIG. 6.

Figure 6:
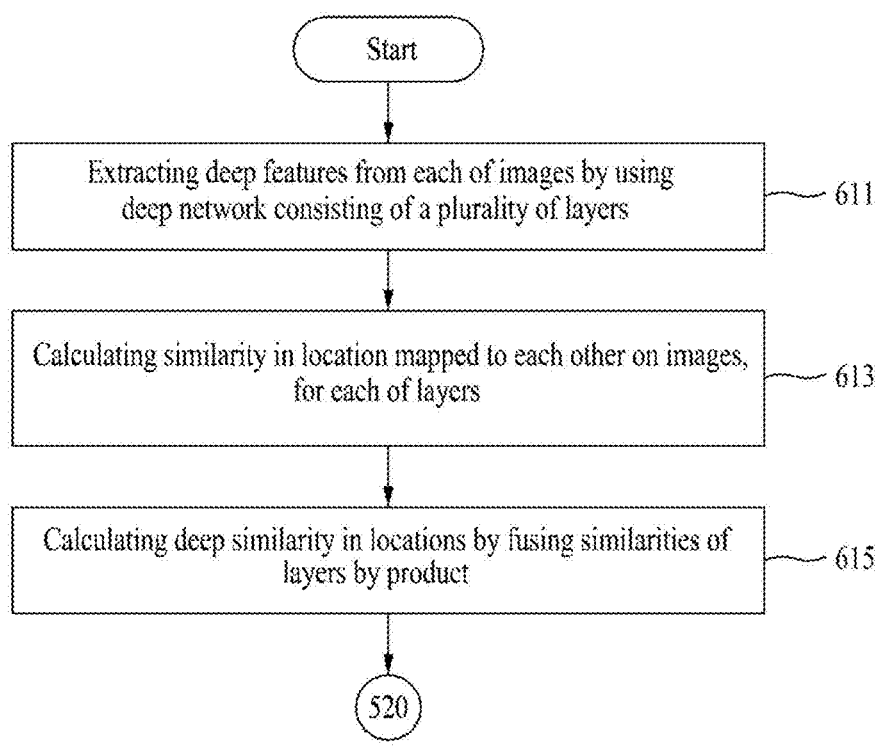
FIG. 6 is a flow chart illustrating a detailed configuration of calculating deep similarity of FIG. 5.

FIG. 6 is a flow chart illustrating a detailed configuration of the calculating deep similarity (Step 510) of FIG. 5.

Referring to FIG. 6, the computer system 100 may extract deep features $h_i^1(t)$, $h_i^1(t+1)$ from each of images I(t), I(t+1) by using a deep network consisting of a plurality of layers in Step 611. At this time, for each of the images I(t), I(t+1), the processor 140 may extract the deep features $h_i^1(t)$, $h_i^1(t+1)$ as space convolutional feature for each of the layers. For example, for six layers, six space convolutional features may be extracted from each of the images I(t), I(t+1), and each of the space convolutional features may consist of the deep features $h_i^1(t)$, $h_i^1(t+1)$ for locations in the corresponding image.

The computer system 100 may calculate similarity in locations mapped to each other on the images I(t), I(t+1) based on an inner product of the deep features $h_i^1(t)$, $h_i^1(t+1)$ of the locations, for each of the layers in Step 613. Through this, the processor 140 may generate similarity maps $sim_1$ of the images I(t), I(t+1) to individually respond to the layers. Here, in each of the similarity maps, location of each similarity may correspond to pixel in the map, and accordingly, the number of similarities may be the same with the number of pixel. For example, for six layers, six similarity maps $sim_1$ may be generated.

In particular, the processor 140 may l2-normalize deep features $h_i^1(t)$, $h_i^1(t+1)$ of a first layer on a channel axis, for each of the images I(t), I(t+1). After this, the processor 140 may calculate similarity of locations mapped to each other on first layers of the images I(t), I(t+1) based on an inner product of the deep features $h_i^1(t)$, $h_i^1(t+1)$ of the locations. At this time, the processor 140 may detect locations mapped to each other on the first layers of the images I(t), I(t+1) based on optical flow of the images I(t), I(t+1) estimated by using the deep learning model for estimating the optical flow, i.e., the deep learning model before learning. The processor 140 may normalize each similarity with a value between 0 and 1. Through this, similarity map sim1 of the first layers of the images I(t), I(t+1) may be generated. With this method, for all layers of the images I(t), I(t+1), similarity maps $sim_1$ may be generated.

The computer system 100 may calculate the deep similarity in locations mapped to each other on the layers by fusing similarities of the locations by a product. Through this, the processor 140 may generate deep similarity maps $sim_f$ of the images I(t), I(t+1). In other words, the processor 140 may generate the deep similarity map $sim_f$ by fusing similarity maps by a product. At this time, since the deep similarity is calculated as a result based on the deep learning model for estimating the optical flow, i.e., the optical flow of the images I(t), I(t+1) estimated by using the deep learning model before learning, the deep similarity may be referred as score or accuracy for the optical flow.

Next, the computer system 100 may return to FIG. 5 and proceed to Step 520. Also, the computer system 100 may learn the optical flow for the images I(t), I(t+1) based on the deep similarity in Step 520. In other words, the computer system 100 may learn the deep learning model for estimating the optical flow through unsupervised learning based on the deep similarity. Regarding this, it will be described in more detail below with reference to FIG. 7.

Figure 7:
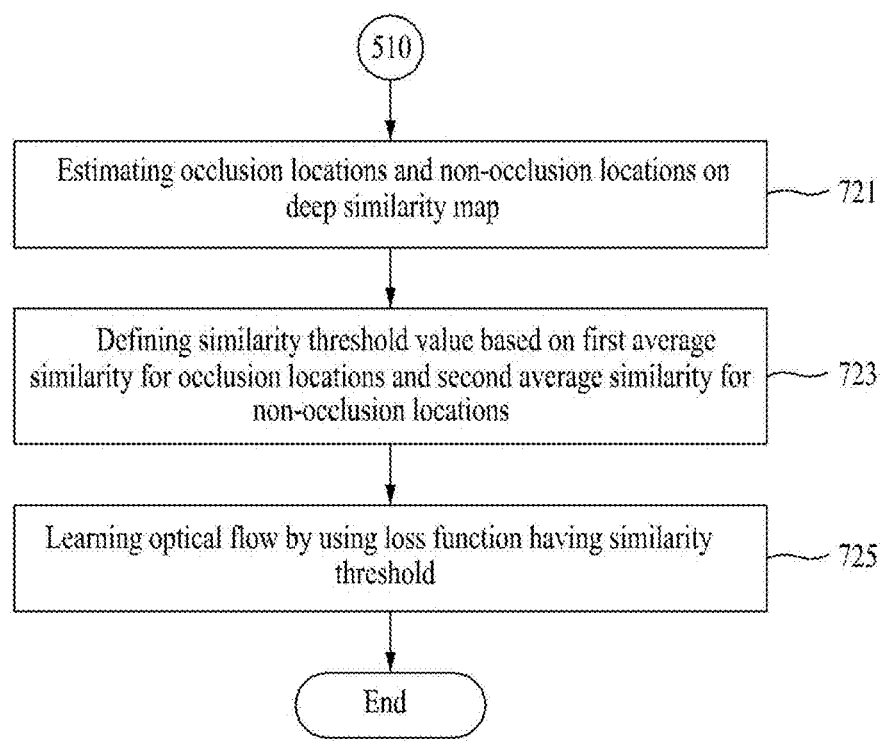
FIG. 7 is a flow chart illustrating a detailed configuration of learning optical flow of FIG. 5.

FIG. 7 is a flow chart illustrating a detailed configuration of the learning the optical flow (Step 520) of FIG. 5.

Referring to FIG. 7, the computer system 100 may configure the feature separation loss function $L_f$ based on the deep similarity map $sim_f$ in Step 721. In particular, the processor 140 may estimate occlusion locations and non-occlusion locations in the deep similarity map $sim_f$. For example, the processor 140 may estimate occlusion locations and non-occlusion locations on the deep similarity map $sim_f$ by analyzing forward-backward consistency of the images I(t), I(t+1).

The computer system 100 may define the similarity threshold value k based on the first average similarity $k_{occ}$ for the occlusion locations and the second average similarity $k_{noc}$ for the non-occlusion locations in Step 723. In particular, the processor 140 may calculate the first average similarity $k_{occ}$ from the deep similarities of the occlusion locations on the deep similarity map $sim_f$, and calculate the second average similarity $k_{noc}$ from the deep similarities of the non-occlusion locations on the deep similarity map $sim_f$. Also, the processor 140 may define the similarity threshold value k based on the first average similarity $k_{occ}$ and the second average similarity $k_{noc}$. At this time, the similarity threshold value k may be an average value of the first average similarity $k_{occ}$ and the second average similarity $k_{noc}$.

The computer system 100 may learn the optical flow by using the loss function L having the similarity threshold value k in Step 725. At this time, the processor 140 may learn the optical flow by using the feature separation loss function $L_f$. For this, the processor 140 may configure the feature separation loss function $L_f$ based on the deep similarity map $sim_f$ and the similarity threshold value k. With this, the feature separation loss function $L_f$ may be configured to increase contrast in the deep similarity map $sim_f$ based on the similarity threshold value k. This may be interpreted that the feature separation loss function $L_f$ may decrease entropy, in other words, minimize entropy.

In some example embodiments, the processor 140 may learn the optical flow by using further at least one of the photometric loss function $L_r$ based on the deep similarity map $sim_f$, the smoothness loss function $L_s$ based on the deep similarity map $sim_f$, and the data distillation loss function $L_d$ as well as the feature separation loss function $L_f$. In other words, the processor 140 may configure the final loss function L based on at least one of the feature separation loss function $L_f$, the photometric loss function $L_r$, the smoothness loss function $L_s$, and the data distillation loss function $L_d$, and may learn the optical flow by using the final loss function L. According to one example embodiment, the processor 140 may configure the final loss function L based on the feature separation loss function $L_f$, the photometric loss function $L_r$, and the smoothness loss function $L_s$. At this time, the processor 140 may apply different weight values (e.g. $\lambda_f, \lambda_s$) for the feature separation loss function $L_f$, the photometric loss function $L_r$, and the smoothness loss function $L_s$. According to another example embodiment, the processor 140 may configure the final loss function L based on the feature separation loss function $L_f$, the photometric loss function $L_r$, the smoothness loss function $L_s$, and the data distillation loss function $L_d$. At this time, the processor 140 may apply different weight values (e.g. $\lambda_f, \lambda_s, \lambda_d$) for the feature separation loss function $L_f$, the photometric loss function $L_r$, the smoothness loss function $L_s$, and the data distillation loss function $L_d$.

According to various example embodiments, the computer system 100 may estimate the optical follow through unsupervised learning. In particular, the computer system 100 may learn the deep learning model for estimating the optical flow through unsupervised learning based on the deep similarity for the sequence of the plurality of images I(t), I(t+1). By using this deep learning model, the computer system 100 may estimate quickly optical flow for a plurality of other images. At this time, the performance of the optical flow may be increased by estimating the optical flow by using the feature separation loss function obtained by dividing occlusion locations and non-occlusion locations on the deep similarity map by the computer system 100. In other words, the computer system 100 may learn higher-performance of the optical flow based on higher-level information.

A method of the computer system 100 according to various example embodiment may include the calculating the deep similarity by using the deep features $h_i^1(t), h_i^1(t+1)$ extracted from the sequence of the plurality of the images I(t), I(t+1) (Step 510), and the learning the optical flow for the images I(t), I(t+1) based on the deep similarity (Step 520).

According to various example embodiments, the deep features $h_i^1(t), h_i^1(t+1)$ may be extracted from each of the images I(t), I(t+1) by using a deep network consisting of a plurality of layers.

According to various example embodiments, the calculating the deep similarity (Step 510) may include the calculating the similarity in the locations mapped to each other on the images I(t), I(t+1) based on an inner product of the deep features $h_i^1(t), h_i^1(t+1)$ of the locations, for each of the layers (Step 613), and calculating the deep similarity in the locations by fusing similarities of the layers by a product (Step 615).

According to various example embodiments, the method of the computer system 100 may further include generating the deep similarity maps $sim_f$ in which all locations of the images I(t), I(t+1) are matched respectively based on the deep similarity.

According to various example embodiments, the learning the optical flow (Step 520) may include the estimating the occlusion locations and non-occlusion locations on the deep similarity maps $sim_f$ (Step 721), defining the similarity threshold value k based on the first average similarity $k_{occ}$ for the occlusion locations and the second average similarity $k_{noc}$ for the non-occlusion locations (Step 723), and learning the optical flow by using the loss function having the similarity threshold value k (Step 725).

According to various example embodiments, the similarity threshold value k may be an average value of the first average similarity $k_{occ}$ and the second average similarity $k_{noc}$.

According to various example embodiments, the loss function may be the feature separation loss function $L_f$ configured to increase contrast in the deep similarity map $sim_f$ based on the similarity threshold value k.

According to various example embodiments, the learning the optical flow by using the loss function (Step 725) may learn the optical flow by using further at least one of the photometric loss function $L_r$ based on the deep similarity map $sim_f$ or the smoothness loss function $L_s$ based on the deep similarity map $sim_f$.

According to various example embodiments, the learning the optical flow by using the loss function (Step 725) may apply different weight values (e.g. $\lambda_f, \lambda_s$) for the feature separation loss function $L_f$, the photometric loss function $L_r$, and the smoothness loss function $L_s$.

The computer system 100 according to various example embodiments may include the memory 130 and the processor 140 connected to the memory, and configured to execute at least one instruction stored in the memory 130.

According to various example embodiments, the processor 140 may be configured to calculate the deep similarity by using the deep features $h_i^1(t), h_i^1(t+1)$ extracted from the sequence of the plurality of the images I(t), I(t+1), and learn the optical flow for the images I(t), I(t+1) based on the deep similarity.

According to various example embodiments, the deep features $h_i^1(t), h_i^1(t+1)$ may be extracted from each of the images I(t), I(t+1) by using the deep network consisting of the plurality of the layers.

According to various example embodiments, the processor 140 may be configured to calculate the similarity in the locations mapped to each other on the images I(t), I(t+1) based on the inner product of the deep features $h_i^1(t), h_i^1(t+1)$ of the locations, for each of the layers, and calculate the deep similarity in the locations by fusing similarities of the layers as by the product.

According to various example embodiments, the processor 140 may be configured to generate the deep similarity map $sim_f$ in which all locations of the images I(t), I(t+1) are matched respectively based on the deep similarity.

According to various example embodiments, the processor 140 may be configured to estimate the occlusion locations and the non-occlusion locations on the deep similarity map $sim_f$, define the similarity threshold value k based on the first average similarity $k_{occ}$ for the occlusion locations and the second average similarity $k_{noc}$ for the non-occlusion locations, and learn the optical flow by using the loss function having the similarity threshold value k.

According to various example embodiments, the similarity threshold value k may be the average value of the first average similarity $k_{occ}$ and the second average similarity $k_{noc}$.

According to various example embodiments, the loss function may be the feature separation loss function $L_f$ configured to increase contrast in the deep similarity map $sim_f$ based on the similarity threshold value k.

According to various example embodiments, the processor 140 may be configured to learn the optical flow by using further at least one of the photometric loss function $L_r$ based on the deep similarity map $sim_f$ or the smoothness loss function $L_s$ based on the deep similarity map $sim_f$.

According to various example embodiments, the processor 140 may apply different weight values (e.g. $\lambda_f, \lambda_s$) for the feature separation loss function $L_f$, the photometric loss function $L_r$, or the smoothness loss function $L_s$.

The system and device described herein may be implemented using hardware components, software components, and/or a combination thereof. For example, the device and components described in the example embodiments may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to various example embodiments may be implemented in the form of a program instruction executable by various computer means and stored in a computer-readable storage medium. The media may also include, alone or in combination with the program instructions, data files, data structures, and the like. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server.

It should be understood that various embodiments of this document and terms used in the embodiments do not limit technology described in this document to a specific embodiment and include various changes, equivalents, and/or replacements of a corresponding embodiment. The same reference numbers are used throughout the drawings to refer to the same or like parts. Unless the context otherwise clearly indicates, words used in the singular include the plural, and the plural includes the singular. In this document, an expression such as "A or B" and "at least one of A or/and B", "A, B or, C" or "at least one of A, B, or/and C" may include all possible combinations of together listed items. An expression such as "first" and "second" used in this document may indicate corresponding components regardless of order or importance, and such an expression is used for distinguishing a component from another component and does not limit corresponding components. When it is described that a component (e.g., a first component) is "(functionally or communicatively) coupled to" or is "connected to" another component (e.g., a second component), it should be understood that the component may be directly connected to the another component or may be connected to the another component through another component (e.g., a third component).

The term "module" used herein may include a unit including hardware, software, or firmware, and, for example, may be interchangeably used with the terms "logic," "logical block," "component" or "circuit". The "module" may be an integrally configured component or a minimum unit for performing one or more functions or a part thereof. For example, the "module" be configured in the form of an Application-Specific Integrated Circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method performed by of a computer system, wherein the computer system comprises at least one processor configured to execute computer-readable instructions included in a memory, the method comprising:
 calculating, by the at least one processor, deep similarity between locations mapped to each other on a sequence of a plurality of images based on an inner product of deep features of the locations extracted from the sequence of a plurality of images;
 generating, by the at least one processor, a deep similarity map in which all locations of the plurality of images are matched respectively based on the deep similarity;
 learning, by the at least one processor, optical flow for the plurality of images based on the deep similarity to learn a deep learning model to estimate optical flow of a sequence of input images; and
 applying, by the at least one processor, the learned deep learning model to the sequence of input images to estimate the optical flow of the sequence of input images,
 wherein the learning of the optical flow comprises:
  estimating occlusion locations and non-occlusion locations on the deep similarity map;
  determining a similarity threshold value based on first average similarity for the occlusion locations and second average similarity for the non-occlusion locations; and
  learning the optical flow by using a loss function having the similarity threshold value.

2. The method of claim 1, wherein the deep features are extracted from the plurality of images respectively, by using a deep network consisting of a plurality of layers.

3. The method of claim 2, wherein the calculating of the deep similarity comprises:
calculating the deep similarity between the locations mapped to each other on the plurality of images based on the inner product of the deep features of the locations, for each of the layers; and
calculating the deep similarity in the locations by fusing similarities of the layers by a product.

4. The method of claim 1, wherein the similarity threshold value is determined as an average value of the first average similarity and the second average similarity.

5. The method of claim 1, wherein the loss function is a feature separation loss function configured to increase contrast in the deep similarity map by determining the similarity threshold value based on the first average similarity and the second average similarity in the deep similarity map, and applying the similarity threshold value to amplify a difference between the occlusion locations and the non-occlusion locations.

6. The method of claim 5, wherein the learning of the optical flow by using the loss function learns the optical flow by further using at least one of a photometric loss function based on the deep similarity map or a smoothness loss function based on the deep similarity map.

7. The method of claim 6, wherein the learning of the optical flow by using the loss function applies different weight values for at least one of the feature separation loss function, the photometric loss function, or the smoothness loss function.

8. A computer system, comprising:
a memory; and
a processor connected to the memory, and configured to execute at least one instruction stored in the memory, wherein the processor is configured to execute the at least one instruction to:
calculate deep similarity between locations mapped to each other on a sequence of a plurality of images based on an inner product of deep features of the locations extracted from the plurality of images;
generate a deep similarity map in which all locations of the plurality of images are matched respectively based on the deep similarity;
learn optical flow for the plurality of images based on the deep similarity to learn a deep learning model to estimate optical flow of a sequence of input images; and
apply the learned deep learning model to the sequence of input images to estimate the optical flow of the sequence of input images,
wherein the processor is configured to execute the at least one instruction to
estimate occlusion locations and non-occlusion locations on the deep similarity map,
determine a similarity threshold value based on first average similarity for the occlusion locations and second average similarity for the non-occlusion locations, and
learn the optical flow by using a loss function having the similarity threshold value.

9. The computer system of claim 8, wherein the deep features are extracted from the plurality of images respectively by using a deep network consisting of a plurality of layers.

10. The computer system of claim 9, wherein the processor is configured to execute the at least one instruction to:
calculate the deep similarity between the locations mapped to each other on the images based on the inner product of the deep features of the locations, for each of the layers; and
calculate the deep similarity in the locations by fusing similarities of the layers as by a product.

11. The computer system of claim 8, wherein the similarity threshold value is determined as an average value of the first average similarity and the second average similarity.

12. The computer system of claim 8, wherein the loss function is a feature separation loss function configured to increase contrast in the deep similarity map calculating the similarity threshold value based on the first average similarity and the second average similarity in the deep similarity map, and applying the similarity threshold value to amplify a difference between the occlusion locations and the non-occlusion locations.

13. The computer system of claim 12, wherein the processor is configured to execute the at least one instruction to learn the optical flow by further using at least one of a photometric loss function based on the deep similarity map or a smoothness loss function based on the deep similarity map.

14. The computer system of claim 13, wherein the processor is configured to execute the at least one instruction to apply different weight values for at least one of the feature separation loss function, the photometric loss function, or the smoothness loss function.

15. A non-transitory computer-readable medium for storing at least one program to be executed by at least one processor of a computer system, wherein the at least one processor executes the at least one program to perform a method comprising:
calculating, by the at least one processor deep similarity between locations mapped to each on a sequence of a plurality of images based on an inner product of deep features of the locations extracted from the plurality of images;
generating, by the at least one processor, a deep similarity map in which all locations of the plurality of images are matched respectively based on the deep similarity;
learning, by the at least one processor, optical flow for the plurality of images based on the deep similarity to learn a deep learning model to estimate optical flow of a sequence of input images; and
applying, by the at least one processor, the learned deep learning model to the sequence of input images to estimate the optical flow of the sequence of input images,
wherein the learning of the optical flow comprises:
estimating occlusion locations and non-occlusion locations on the deep similarity map;
determining a similarity threshold value based on first average similarity for the occlusion locations and second average similarity for the non-occlusion locations; and
learning the optical flow by using a loss function having the similarity threshold value.

* * * * *